(12) United States Patent
Zemenchik et al.

(10) Patent No.: US 9,775,278 B2
(45) Date of Patent: *Oct. 3, 2017

(54) ROLLING BASKET DOWN PRESSURE ADJUSTMENT SYSTEM

(71) Applicant: CNH Industrial America LLC, New Holland, PA (US)

(72) Inventors: Robert A. Zemenchik, Kenosha, WI (US); Dean A. Knobloch, Tucson, AZ (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/532,558

(22) Filed: Nov. 4, 2014

(65) Prior Publication Data

US 2015/0156962 A1 Jun. 11, 2015

Related U.S. Application Data

(60) Provisional application No. 61/914,629, filed on Dec. 11, 2013.

(51) Int. Cl.
| | | |
|---|---|---|
| *A01B 63/32* | (2006.01) | |
| *A01B 79/00* | (2006.01) | |
| *A01B 49/02* | (2006.01) | |

(52) U.S. Cl.
CPC .......... *A01B 79/005* (2013.01); *A01B 49/027* (2013.01); *A01B 63/32* (2013.01)

(58) Field of Classification Search
CPC ... A01B 33/087; A01B 63/111; A01B 63/114; A01B 29/00–29/06
See application file for complete search history.

(56) References Cited

U.S. PATENT DOCUMENTS

| | | | |
|---|---|---|---|
| 3,633,679 A | 1/1972 | Dahlberg et al. | |
| 4,489,789 A | 12/1984 | Pearce | |
| 5,234,060 A | 8/1993 | Carter | |
| 5,653,292 A | 8/1997 | Ptacek et al. | |
| 5,833,011 A | 11/1998 | Boertlein | |
| 6,068,061 A | 5/2000 | Smith et al. | |
| 6,076,611 A | 6/2000 | Rozendaal et al. | |
| 6,554,078 B1 * | 4/2003 | McDonald | A01B 49/027 172/146 |
| 6,761,120 B2 | 7/2004 | Kovach et al. | |
| 6,843,047 B2 | 1/2005 | Hurtis | |
| 6,871,709 B2 | 3/2005 | Knobloch et al. | |

(Continued)

*Primary Examiner* — Matthew D Troutman
(74) *Attorney, Agent, or Firm* — Rebecca L. Henkel; Rickard K. DeMille

(57) ABSTRACT

An agricultural tillage implement including a frame section having a pull hitch extending in a travel direction, at least one secondary frame coupled with the frame, a plurality of rolling basket assemblies, a geographical position determining device, and a pressure control system. The secondary frame is coupled to the frame. The plurality of rolling basket assemblies are coupled to the secondary frame. The geographical position determining device generates a geo-position signal. The pressure control system is coupled to the plurality of rolling basket assemblies. The pressure control system is configured to supply a selected pressure to each of the plurality of rolling basket assemblies dependent upon the geo-position signal.

12 Claims, 4 Drawing Sheets

(56) References Cited

U.S. PATENT DOCUMENTS

| | | | |
|---|---|---|---|
| 6,896,068 B2* | 5/2005 | Dietrich, Sr. | A01B 49/027 172/142 |
| 6,926,093 B1* | 8/2005 | Fink | A01B 63/26 172/261 |
| 7,017,675 B2* | 3/2006 | Ankenman | A01B 49/02 172/142 |
| 7,065,945 B2 | 6/2006 | Hurtis | |
| 7,766,093 B2 | 8/2010 | Becker et al. | |
| 8,020,629 B1* | 9/2011 | McFarlane | A01B 21/08 172/145 |
| 8,047,299 B2 | 11/2011 | Hurtis et al. | |
| 8,074,730 B2* | 12/2011 | Kovach | A01B 49/02 172/170 |
| D667,847 S * | 9/2012 | Kovach | D15/11 |
| 8,430,179 B2 | 4/2013 | Van Buskirk et al. | |
| 8,573,319 B1* | 11/2013 | Casper | A01B 63/114 172/4 |
| 2003/0196823 A1* | 10/2003 | McDonald | A01B 49/027 172/146 |
| 2004/0016554 A1* | 1/2004 | McDonald | A01B 49/027 172/146 |
| 2006/0021769 A1* | 2/2006 | Ankenman | A01B 49/02 172/156 |
| 2008/0066935 A1* | 3/2008 | Becker | A01B 63/32 172/13 |
| 2010/0084148 A1* | 4/2010 | Kovach | A01B 49/027 172/145 |
| 2011/0100654 A1* | 5/2011 | Kovach | A01B 49/02 172/165 |
| 2011/0284252 A1 | 11/2011 | Friggstad et al. | |
| 2012/0227991 A1* | 9/2012 | Hake | A01B 39/08 172/1 |
| 2013/0341056 A1* | 12/2013 | Casper | A01B 63/111 172/4 |
| 2014/0054051 A1* | 2/2014 | Landoll | A01B 63/008 172/170 |
| 2014/0209335 A1* | 7/2014 | Casper | A01B 5/04 172/260.5 |
| 2014/0251646 A1* | 9/2014 | Gray | A01B 61/044 172/1 |
| 2015/0053433 A1* | 2/2015 | Kovach | A01B 49/027 172/1 |
| 2015/0156962 A1* | 6/2015 | Zemenchik | A01B 79/005 172/1 |

* cited by examiner

US 9,775,278 B2

ROLLING BASKET DOWN PRESSURE ADJUSTMENT SYSTEM

CROSS REFERENCE TO RELATED APPLICATIONS

This is a non-provisional application based upon U.S. provisional patent application Ser. No. 61/914,629, entitled "ROLLING BASKET DOWN PRESSURE ADJUSTMENT SYSTEM", filed Dec. 11, 2013, which is incorporated herein by reference.

BACKGROUND OF THE INVENTION

1. Field of the Invention

The present invention relates to agricultural implements, and, more particularly, to agricultural tillage implements.

2. Description of the Related Art

Farmers utilize a wide variety of tillage implements to prepare soil for planting. Some such implements include two or more sections coupled together to perform multiple functions as they are pulled through fields by a tractor. For example, a field cultivator is capable of simultaneously tilling soil and leveling the tilled soil in preparation for planting. A field cultivator has a frame that carries a number of cultivator shanks with shovels at their lower ends for tilling the soil. The field cultivator converts compacted soil into a level seedbed with a consistent depth for providing excellent conditions for planting of a crop. Grass or residual crop material disposed on top of the soil is also worked into the seedbed so that it does not interfere with a seeding implement subsequently passing through the seedbed.

A field cultivator as described above may also include an optional rear auxiliary implement for finishing the seedbed for seeding. For example, a rear auxiliary implement may include a spike tooth harrow, spring tooth harrow, rolling (aka. crumbler) basket, etc., or any combination thereof. The rolling basket has a reel with a plurality of blades for breaking clods into smaller sizes and chopping up the debris still remaining on the top of the soil.

The rolling basket arrangement can be used to roll behind the rows of tines of a harrow, to flatten the ridges left by the tines and move the residual crop material into the soil to enhance contact with the soil. The rolling basket is used to provide a firm, level field with coarse soil on top that resists crusting, with the finer soil particles at planting depth for optimum seed-to-soil contact.

The control of the positioning of the rolling baskets include fixed position settings carried out with pins, bolts or mechanical crank adjustments, which requires the operator to manually adjust the framework coupled to the rolling baskets to adjust the downward pressure on the rolling baskets to thereby control the depth of the blades.

What is needed in the art is an easy to use mechanism for the adjusting of down pressure of rolling baskets of an agricultural tillage implement as the implement traverses a field.

SUMMARY OF THE INVENTION

The present invention provides a tillage implement with rolling basket assemblies, which are configured to provide an adjustable down pressure of the rolling baskets.

The invention in one form is directed to an agricultural tillage implement including a frame section having a pull hitch extending in a travel direction, at least one secondary frame coupled with the frame, a plurality of rolling basket assemblies, a geographical position determining device, and a pressure control system. The secondary frame is coupled to the frame. The plurality of rolling basket assemblies are coupled to the secondary frame. The geographical position determining device generates a geo-position signal. The pressure control system is coupled to the plurality of rolling basket assemblies. The pressure control system is configured to supply a selected pressure to each of the plurality of rolling basket assemblies dependent upon the geo-position signal.

The invention in another form is directed to a rolling basket implement attached to an agricultural tillage implement having a frame and at least one secondary frame, the rolling basket implement including a plurality of rolling basket assemblies, a geographical position determining device, and a pressure control system. The secondary frame is coupled to the frame. The plurality of rolling basket assemblies are coupled to the secondary frame. The geographical position determining device generates a geo-position signal. The pressure control system is coupled to the plurality of rolling basket assemblies. The pressure control system is configured to supply a selected pressure to each of the plurality of rolling basket assemblies dependent upon the geo-position signal.

The invention in yet another form is directed to a method of controlling down pressure of rolling basket assemblies coupled to an agricultural implement, the method includes the steps of determining a geo-position of a rolling basket and applying a down pressure to the rolling basket dependent upon the geo-position.

An advantage of the present invention is that the cultivator can employ rolling baskets sensitive to the soil characteristics upon which it travels.

Another advantage is that the down pressure of the rolling baskets is adjusted based upon changing soil characteristics.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate some embodiments of the invention and such exemplifications are not to be construed as limiting the scope of the invention in any manner.

DETAILED DESCRIPTION OF THE INVENTION

Figure 1:
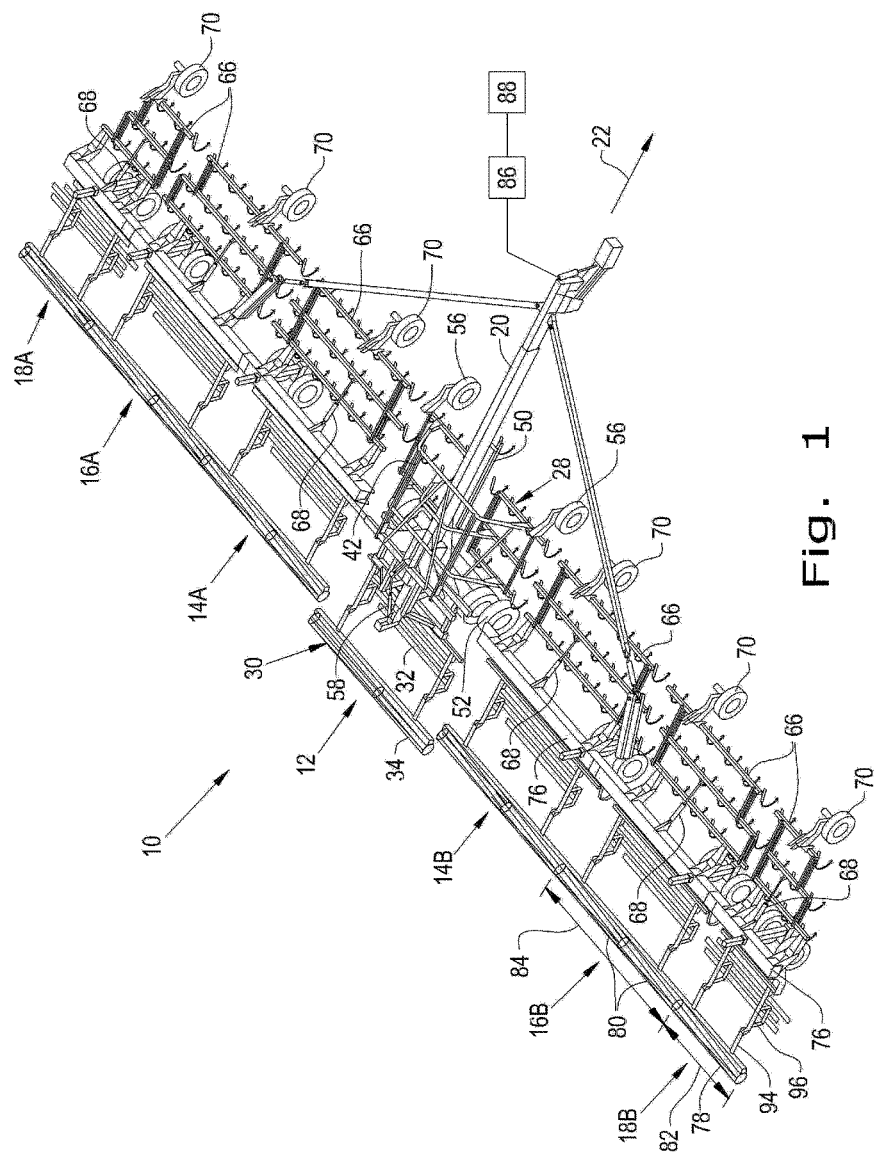
FIG. 1 is a top perspective view of an embodiment of an agricultural tillage implement, in the form of a field cultivator utilizing rolling basket assemblies of the present invention.
Figure 2:
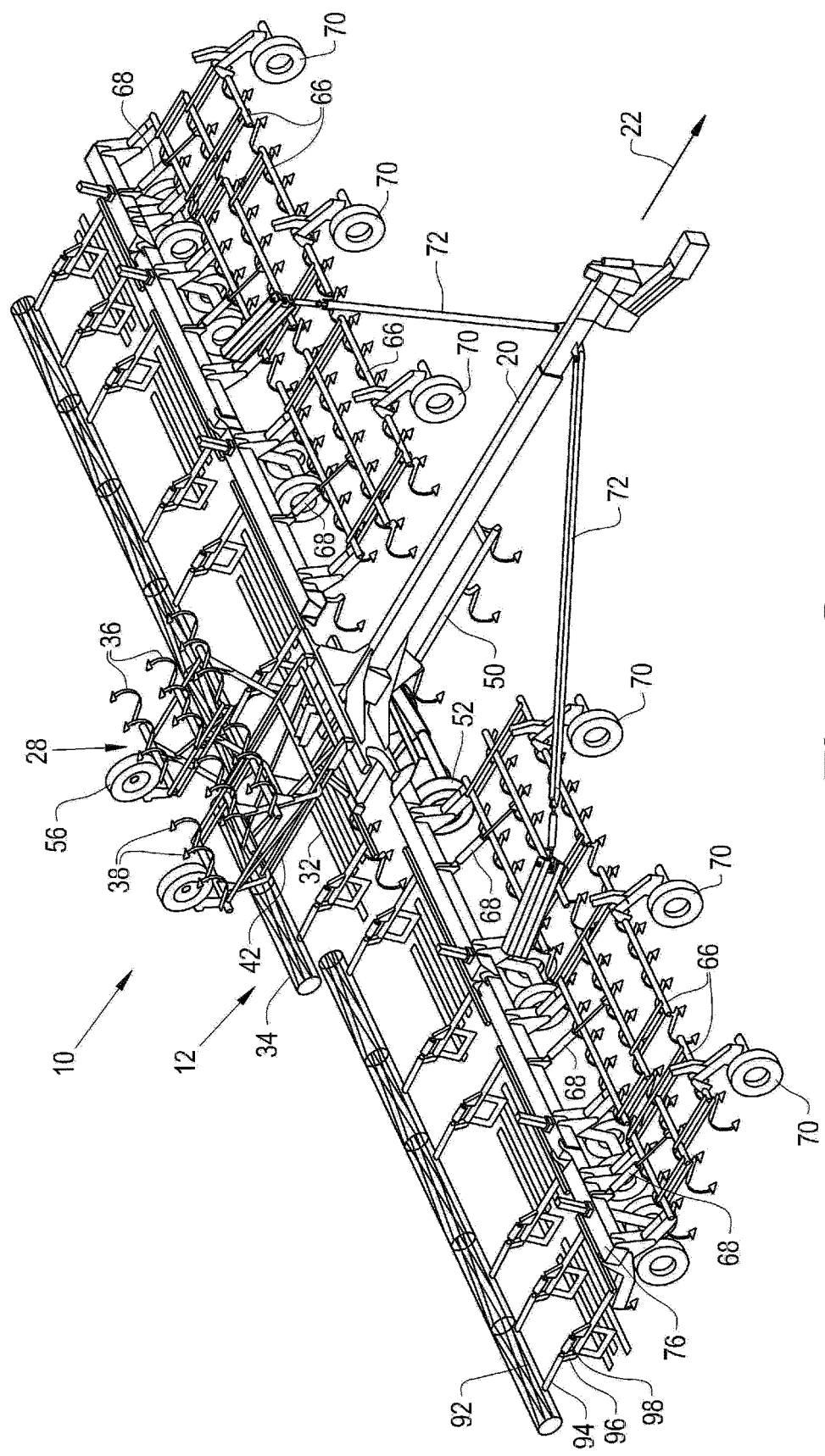
FIG. 2 is the same top perspective view shown in FIG. 1, with the center shank frame folded to a transport position.
Figure 3:
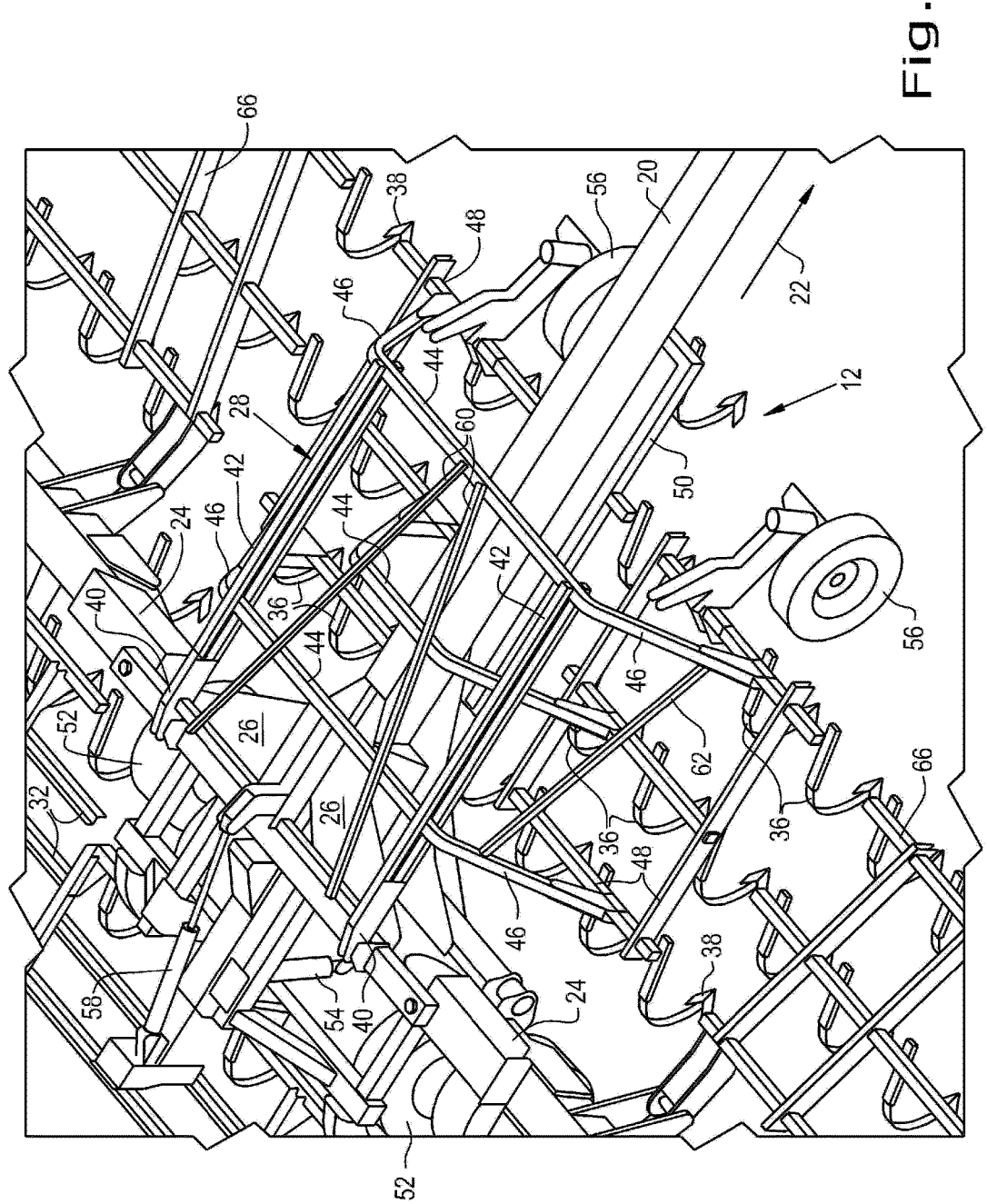
FIG. 3 is a top perspective view of the center frame section with the center shank frame in the operating position.

Referring now to the drawings, and more particularly to FIGS. 1-3, there is shown an embodiment of a tillage implement of the present invention. In the illustrated embodiment, the tillage implement is in the form of a field cultivator 10 for tilling and finishing soil prior to seeding.

Field cultivator 10 as illustrated in FIG. 1 is configured as a multi-section field cultivator, and includes a main frame section 12 and a plurality of wing sections 14, 16 and 18. The left wings sections are designated 14A, 16A and 18A, and the right wing sections are designated 14B, 16B and 18B. Wing sections 14A and 14B are each inner wing sections, wing sections 16A and 16B are each middle wing sections, and wing sections 18A and 18B are each outer wing sections.

Main frame section 12 is the center section that is directly towed by a traction unit, such as an agricultural tractor (not shown). Main frame section 12 includes a pull hitch tube 20 extending in a travel direction 22, and a tool bar 24 which is coupled with and extends transverse to pull hitch tube 20. Reinforcing gusset plates 26 may be used to strengthen the connection between pull hitch tube 20 and tool bar 24. Main frame section 12 generally functions to carry a shank frame 28 for tilling the soil, and a rear auxiliary implement 30 for finishing the soil. Rear auxiliary implement 30 includes a spring tooth drag 32 and a rolling (aka, crumbler) basket assemblies 34 which coact with each other to finish the soil.

Figure 4:
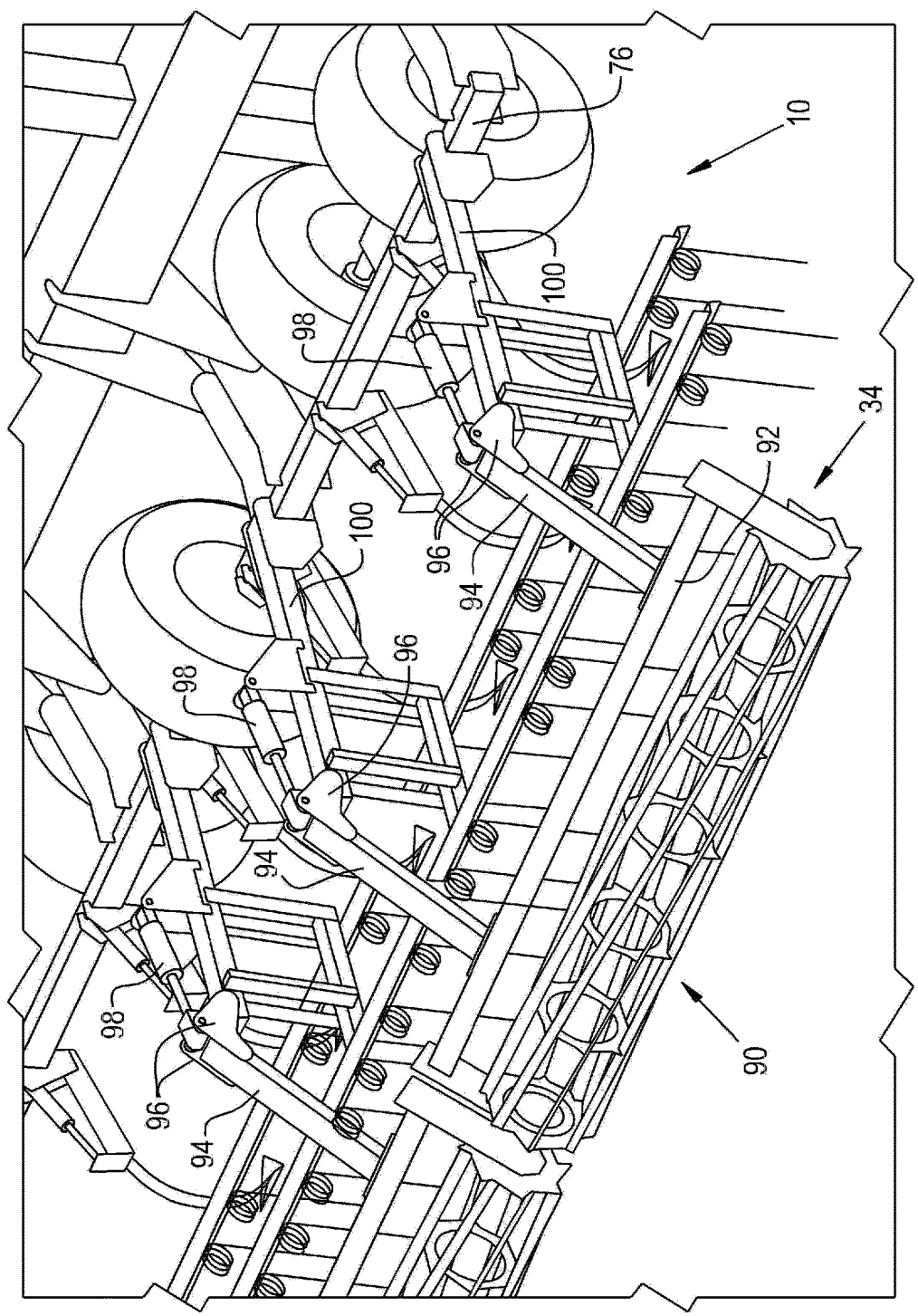
FIG. 4 is a perspective view of one of the rolling basket assemblies used with the tillage implement shown in FIGS. 1-3.

Shank frame 28 generally functions to carry cultivator shanks 36 with shovels 38 at their lower ends for tilling the soil. Shank frame 28 is pivotally coupled with tool bar 24, preferably at the top of tool bar 24, such as with couplings 40. Shank frame 28 is positioned in front of the tool bar 24 when in an operating position (FIGS. 1 and 3), and is foldable up and over the tool bar 24 to a position rearward of tool bar 24 when in a transport position (FIGS. 2 and 4). Shank frame 28 includes a pair of longitudinal frame members 42 which are pivotally coupled with tool bar 24 at one end thereof using couplings 40. A plurality of cross frame members 44 are coupled with the longitudinal frame members 42. Each of the cross frame members 44 have a pair of opposite outboard ends 46 which extend horizontally past longitudinal frame members 42, then in a downwardly angled direction, whereby the outboard ends 46 are positioned on opposite lateral sides of the pull hitch tube 20 when in an operating position. The outboard ends 46 of cross frame members 44 are coupled with a pair of respective shank sub-frames 48. Shank sub-frames 48 are spaced apart from each other in a direction transverse to pull hitch tube 20 and are positioned on respective opposite lateral sides of pull hitch tube 20 when in an operating position.

A center shank sub-frame 50 is attached to and positioned below pull hitch tube 20. Since shank sub-frames 48 are spaced apart on either side of pull hitch tube 20, center shank sub-frame 50 functions to till the soil in the intermediate open space between the two shank sub-frames 48. Center shank sub-frame 50 includes a number of cultivator shanks and corresponding shovels; three in the illustrated embodiment. Center shank sub-frame 50 is raised up and down with the raising and lowering of rear lift wheels 52 using hydraulic cylinder 54.

Shank frame 28 also includes one or more gauge wheel assemblies 56 which function to set a tillage depth of shank sub-frames 48. In the illustrated embodiment, shank frame 28 includes two gauge wheel assemblies 56 which are respectively coupled with a front of a respective shank sub-frame 48. A hydraulic cylinder 58 is used to fold shank frame 28 from the operating position to the transport position, and vice versa. Hydraulic cylinder 58 may be placed in a "float mode" such that gauge wheel assemblies 56 are operable to float up and down as they traverse across a field and thereby set the operating depth at the front edge of shank frame 28.

Shank frame 28 may also include additional support frame members 60 and 62 which provide structural rigidity. Support frame members 60 extend diagonally across the top of shank frame 28, and support frame members 62 extend diagonally between the outboard ends 46 of cross frame members 44.

A hydraulic cylinder 54 is provided to lift the frame using rear lift wheels 52 to configure cultivator 10 for transport. Hydraulic cylinder 58 is provided to fold shank frame 28 up and over tool bar 24 to an inverted position rearward of tool bar 24. Shank sections 66 of the wing sections 14, 16 and 18 are configured to be folded upwards to a position at or near vertical using hydraulic cylinders 68. Diagonally angled boom arms 72 extend between a forward end of pull hitch tube 20 and a respective tool bar 24 associated with the pair of middle wing sections 16A and 16B. Gauge wheel assemblies 56 at the front of center shank frame 28 and gauge wheel assemblies 70 at the front of wing sections 14, 16 and 18 are all configured as caster wheels so that they can pivot to a travel direction when field cultivator 10 is moved in travel direction 22 when in the folded or transport state.

Now additionally referring to FIG. 4 there is shown an additional view of a portion of the rear of implement 10, here with rolling basket assemblies 34 with secondary frame 76 coupled to structural elements of implement 10. Rolling basket assemblies 34 include at least one rolling basket 90. In FIG. 1 there is shown a specific rolling basket assembly 78 and a rolling basket assembly 80. Here rolling basket assembly 78 has an effective length 82, which is the total length of the rolling baskets which make up rolling basket assembly 78. In a similar fashion rolling basket assembly 80 has an effective length 84. A pressure control system 86 is used to alter the pressure applied to rolling basket assemblies 78 and 80 proportional to effective lengths 82 and 84 so that a substantially equal down pressure per linear unit of measure is established.

Rolling basket assemblies 34 each have a set of rolling baskets 90, each rolling basket 90 is rotationally coupled to respective sub-frames 92. Pivoting arms 94 are connected to sub-frame 92 and are pivotally coupled to a support member 100 and hence indirectly to secondary frame 76, by way of brackets 96. Actuators 98, illustrated here in the form of hydraulic cylinders, are pivotally coupled to brackets 96. In turn brackets 96 are pivotally coupled to the supporting frame and have pivot arms 94 extending therefrom. Pressure control system 86, which may include valves, provides the selected pressures to actuators 98 to provide equalized down pressure (as modified by the geographic position, as discussed herein) for rolling baskets 90 even though rolling baskets 90 may have differing lengths as 82 and 84.

Pressure control system 86 may include a set of valves that direct the appropriate down pressure to each rolling basket assembly 34 so that the down pressure is uniform and may be 120 lbs/ft, although other pressures are also contemplated. Pressure control system 86 may be located in the towing vehicle (not shown) or connected to a part of the structure of tillage implement 10. When it is time for lifting rolling basket assemblies 34 up from the ground, the proportional pressures supplied by pressure control system 86 is removed and a reverse action by actuators 98 is performed to lift rolling basket assemblies 34 up. It is also contemplated to have a float mode where no pressurized fluid is supplied by pressure control system 86 and there may be no fluid flow constrictions to allow rolling basket assemblies 34 to float on the ground.

As seen in FIG. 1 sections 18A and 18B have smaller effective lengths than sections 16A and 16B. In addition to compensating for the differing effective lengths of the rolling baskets and the number of actuators associated with each rolling basket assembly 34, it is contemplated that pressure control system 86 will also compensate for differing diameters of rolling baskets, differing number of bars in the rolling baskets, differing lengths of pivot arms, and differing actuator characteristics to apply a substantially equalized down pressure per unit of effected area beneath the rolling baskets, yet being subject to an alteration in the pressure as the position of implement 10 in the field changes.

A geographic position determining device 88 interfaces with pressure control system 86 so that pressures applied by individual rolling basket assemblies 34 are adjusted based upon the geographical position of each rolling basket assembly 34 in the field. Similar to pressure control system 86, geographic position determining device 88 may be located in the towing vehicle (not shown) or connected to a part of the structure of tillage implement 10. Geographic position determining device 88 produces a geo-position signal that relates to each of the rolling basket assemblies 34 so that the down pressure applied to rolling baskets 90 is adjusted dependent upon the geo-position signal. Soil characteristics at differing locations are referred to by device 88 in order to alter the geo-position signal. The combination of soil characteristics is also considered in generation of the geo-position signal. The operator of implement 10 can input observed soil characteristics throughout the field, which can serve as the only input, a primary input or a secondary input to device 88, used in conjunction with stored data or by ignoring any stored data, depending upon the operator's desire.

Soil characteristics include, for example, soil content and soil moisture content. Soil content includes at least soil texture, mineral composition, particle size, organic material, residual material and permeability of the soil. Moisture content, for example, can vary significantly across a field and the variation of down pressure on each rolling basket 90 is altered to adjust to the varying moisture content, or any other soil characteristic. In the prior art a basket with only one down pressure setting may be set of an average field condition, which means that the pressure will be too high for part of the field and too low for another part of the field.

Advantageously, the present invention individually controls actuators 98 to provide for the geo-sensitive adjustment of down pressure on the rolling baskets. Another advantage is that the present invention is applicable to a large number of tillage equipment platforms.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural tillage implement for use in a field, the agricultural tillage implement comprising:
    a frame section including a pull hitch extending in a travel direction;
    at least one secondary frame coupled with the frame;
    a plurality of rolling basket assemblies coupled to the at least one secondary frame, each of the rolling basket assemblies having at least one rolling basket coupled thereto, wherein the plurality of rolling basket assemblies includes a first rolling basket assembly having a first length and a second rolling basket assembly arranged outwardly of the first rolling basket assembly and having a second length that is less than the first length;
    a plurality of actuators arranged with respect to the secondary frame and the rolling basket assemblies for respectively moving the basket assemblies relative to the secondary frame, wherein the actuators selectively move the basket assemblies in one of a generally downward direction and a generally upward direction; and
    a pressure control system coupled to the plurality of rolling basket assemblies, the pressure control system controlling the actuators to:
        apply pressures in the actuators in a first direction and alter the pressures applied to the rolling basket assemblies when moving the basket assemblies in the generally downward direction so that a substantially equal down pressure per linear unit of measure of each rolling basket assembly is established when moving the basket assemblies in the generally downward direction; and
        apply pressures in the actuators in a second, opposite, direction to lift the rolling basket assemblies when moving the basket assemblies in the generally upward direction.

2. The agricultural tillage implement of claim 1, wherein each of the rolling basket assemblies further includes:
    a sub-frame;
    at least one rolling basket rotationally coupled to said sub-frame;
    at least one pivoting arm pivotally coupled to the secondary frame, the at least one pivoting arm being connected to the sub-frame; and
    wherein respective ones of the actuators are arranged to move the at least one pivoting arm, and wherein the actuators are configured for receiving a pressurized fluid under control of the pressure control system.

3. The agricultural tillage implement of claim 1, wherein said pressure control system is further configured to alter said selected pressure dependent upon information about a soil characteristic proximate to said rolling basket assembly.

4. The agricultural tillage implement of claim 3, wherein said information is geo-positionally related.

5. The agricultural tillage implement of claim 4, wherein said soil characteristic includes at least one of soil content and soil moisture content.

6. The agricultural tillage implement of claim 5, wherein said soil content includes at least one of soil texture, mineral composition, particle size, organic material, residual material and permeability.

7. A rolling basket implement attached to an agricultural tillage implement having a frame connected to at least one secondary frame, the rolling basket implement comprising:
    a plurality of rolling basket assemblies coupled to the at least one secondary frame, wherein the plurality of rolling basket assemblies includes a first rolling basket assembly having a first length and a second rolling basket assembly arranged outwardly of the first rolling basket assembly and having a second length that is less than the first length;

a plurality of actuators arranged with respect to the at least one secondary frame and the rolling basket assemblies for selectively pushing the basket assemblies toward an agricultural field and lifting the basket assemblies away from the agricultural field; and a pressure control system controlling the actuators to alter the pressure applied to the rolling basket assemblies so that a substantially equal down pressure per linear unit of measure of each rolling basket assembly is established while pushing the basket assemblies toward the agricultural field.

8. The rolling basket implement of claim 7, wherein each of the rolling basket assemblies further includes:

a sub-frame;

at least one rolling basket rotationally coupled to said sub-frame;

at least one pivoting arm pivotally coupled to the secondary frame, the at least one pivoting arm being connected to the sub-frame; and wherein respective ones of the actuators are arranged to move the at least one pivoting arm, and wherein the actuators are configured for receiving a pressurized fluid under control of the pressure control system.

9. The rolling basket implement of claim 7, wherein said pressure control system is further configured to alter said selected pressure dependent upon information about a soil characteristic proximate to said rolling basket assembly.

10. The rolling basket implement of claim 9, wherein said information is geo-positionally related.

11. The rolling basket implement of claim 10, wherein said soil characteristic includes at least one of soil content and soil moisture content.

12. The rolling basket implement of claim 11, wherein said soil content includes at least one of soil texture, mineral composition, particle size, organic material, residual material and permeability.

* * * * *